United States Patent
Ishitoya et al.

(10) Patent No.: US 7,142,313 B2
(45) Date of Patent: Nov. 28, 2006

(54) INTERAXIS ANGLE CORRECTION METHOD

(75) Inventors: Takao Ishitoya, Kawasaki (JP); Fumihiro Takemura, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 11/370,345

(22) Filed: Mar. 8, 2006

(65) Prior Publication Data

US 2006/0209296 A1     Sep. 21, 2006

(30) Foreign Application Priority Data

Mar. 17, 2005 (JP) .............................. 2005-076566

(51) Int. Cl.
*G01B 11/14* (2006.01)
*G01B 5/00* (2006.01)
*C01B 21/00* (2006.01)

(52) U.S. Cl. .................. 356/614; 33/503; 33/559; 73/1.79; 702/95

(58) Field of Classification Search ........ 356/601–625, 356/138; 33/502–503, 556, 559; 73/1.79, 73/1.01; 702/95
See application file for complete search history.

(56) References Cited

U.S. PATENT DOCUMENTS

| | | | | |
|---|---|---|---|---|
| 5,117,169 | A * | 5/1992 | Kakino et al. ............... | 318/578 |
| 5,283,630 | A * | 2/1994 | Yoshizumi ................... | 356/601 |
| 5,694,339 | A * | 12/1997 | Ishitoya et al. ............. | 702/167 |
| 5,825,666 | A * | 10/1998 | Freifeld ........................ | 702/153 |
| 6,453,730 | B1 * | 9/2002 | Takemura ..................... | 73/105 |
| 6,546,643 | B1 * | 4/2003 | Lotze et al. .................. | 33/559 |
| 6,651,351 | B1 * | 11/2003 | Christoph et al. ............ | 33/503 |
| 6,701,268 | B1 * | 3/2004 | Noda et al. ................... | 702/95 |
| 6,748,790 | B1 * | 6/2004 | Abbe ........................... | 73/1.79 |
| 7,055,367 | B1 * | 6/2006 | Hajdukiewicz et al. ...... | 73/1.79 |
| 2002/0085213 | A1 * | 7/2002 | Yamamoto et al. ......... | 356/614 |

FOREIGN PATENT DOCUMENTS

JP         07146130 A    *  6/1995

OTHER PUBLICATIONS

Japanese Patent Abstract Publication No. 2003-302202 published Oct. 24, 2003, Application No. 2002-106827, filed Apr. 9, 2002, 29 pages.

* cited by examiner

*Primary Examiner*—Sang H. Nguyen
(74) *Attorney, Agent, or Firm*—Rankin, Hill, Porter & Clark LLP (57) ABSTRACT

An interaxis-angle correction method comprising: a reference sphere measurement step of scanning, with the sensor, a reference sphere located on the table, in the measurement-axis direction at a translation-axis-direction position on the reference sphere to acquire measurement-axis-direction contour information, and performing the scanning at a plurality of different translation-axis-direction positions on the same reference sphere, with the table being linearly translated; a peak detection step of detecting a peak point in the measurement-axis-direction contour information, and performing the detection for each set of measurement-axis-direction contour information; an error information acquisition step of obtaining information related to the inclination of an actual straight line based on each peak point with respect to an ideal straight line; a correction information acquisition step of obtaining correction information for correcting a measurement error related to the position in the measurement-axis direction, caused by the inclination of the actual straight line; and a correction step.

3 Claims, 5 Drawing Sheets

INTERAXIS ANGLE CORRECTION METHOD

RELATED APPLICATIONS

This application claims priority to the Japanese Patent Application 2005-76566 dated on Mar. 17, 2005 and is hereby incorporated with reference for all purposes.

BACKGROUND OF THE INVENTION

1. Field of the Invention

The present invention relates to methods for correcting an interaxis angle. More particularly, the present invention relates to an improved error measurement method and correction calculation method for eliminating position measurement errors caused by interaxis angle errors in an apparatus having a plurality of axes.

2. Prior Art

In the conventional art, form measuring instrument are used to carry out contour measurement. In order to improve the contour measurement accuracy, it is important to reduce errors. There are many origins of errors, but in multiaxis form measuring instrument, it is particularly important to reduce the errors between individual axial movements.

Thus, in conventional form measuring instrument, the errors between individual axial movements are normally reduced by improving the manufacturing accuracy.

However, in the field of contour measurement, there are demands for measurement apparatus with higher accuracy because of improvements being made in the accuracy of workpieces. In practice, for example, the mechanical manufacturing accuracy of Y-axis tables for measurement apparatuss is limited to about 20 μm/200 mm (about 0.0057 degrees). Higher perpendicularity is required for high accuracy workpieces such as those with aspherical surfaces.

Therefore, in apparatuss for handling high accuracy workpieces, it is essential to further reduce the errors in individual axial movements; however, because the reduction in errors achievable by improving the mechanical manufacturing accuracy is limited, as described above, it is difficult to reduce the errors any further.

In the conventional art, in order to attempt to reduce the effects of such movement errors, the positioning accuracy of each axis of the apparatus is measured based on a calibration gauge.

One error measurement method in the conventional art is a technique for measuring the scale error, straightness, and perpendicularity of the apparatus, for example, with a calibration gauge using a so-called inversion method (see Japanese Unexamined Patent Application Publication No. 2003-302202).

However, in the conventional art described above, it is necessary to position the calibration gauge in the apparatus and to perform measurement and error calculation for the same position before and after inverting the calibration gauge. Therefore, there is still room for improvement in terms of simplifying the measurement procedure.

Also, in the conventional art described above, although the concept of determining correction values based on the error measurement results and correcting the measured values has been conceived, no concrete correction calculation method has yet been established.

Therefore, in the field of multiaxis apparatus, there is an urgent need to develop a technology that will enable a reduction in position measurement errors caused by interaxis angle errors, with higher accuracy and greater ease.

SUMMARY OF THE INVENTION

The present invention has been conceived to overcome the problems with the conventional art described above, and it is an object thereof to provide an interaxis angle correction method that can perform interaxis angle correction easily and with high accuracy in a multiaxis apparatus.

As a result of extensive investigation into improving the accuracy and ease of interaxis angle correction in a multiaxis apparatus, the inventors of the present invention have found that it is extremely important to first select the calibration gauge and error measurement principle described below and to combine these aspects.

More specifically, the inventors of the present invention have employed the features described below to improve the accuracy and ease of interaxis angle correction in the apparatus. First, the inventors selected a single reference sphere from among a plurality of calibration gauges to use as the calibration gauge. Furthermore, although there are numerous available techniques for error measurement, the principle selected by the inventors is as follows: when an actual direction of motion of a table with respect to a measurement axis is to form a desired angle accurately, peak points at a plurality of different positions on the same reference sphere in the direction of the translation axis are accurately aligned on an ideal straight line accurately forming the desired angle with respect to the measurement axis.

Combining such a calibration gauge with the error measurement principle described above in the present invention allowed further higher accuracy and more simple interaxis angle correction in a multiaxis apparatus, thus accomplishing the object of the invention.

More specifically, in order to realize the above object, a method according to the present invention is, for an apparatus including a table and a sensor, corrects an error in an angle formed by a measurement axis and a translation axis, and comprises: a reference sphere measurement step; a peak detection step; an error information acquisition step; a correction information acquisition step; and a correction step.

Here, the table linearly translates in a reference plane along the translation axis which should form a desired angle at the reference plane with respect to a reference line provided on the reference plane.

The sensor has the reference line provided on the reference plane as the axis of measurement.

The reference sphere measurement step scans, with the sensor, a reference sphere located on the table of the apparatus, in the measurement-axis direction at a designated translation-axis-direction position on the reference sphere to acquire measurement-axis-direction contour information, and performs the scanning and acquisition at a plurality of different designated translation-axis-direction positions on the same reference sphere, with the table being linearly translated.

The peak detection step detects a peak point in the measurement-axis-direction contour information acquired in the reference sphere measurement step, and performs the detection for each set of measurement-axis-direction contour information acquired in the reference sphere measurement step.

The error information acquisition step determines an actual straight line representing an actual direction of motion of the table based on position information of each peak point detected in the peak detection step, and obtains information related to the inclination of the actual straight line with respect to an ideal straight line representing an ideal direction of motion of the table.

The correction information acquisition step obtains correction information for correcting a measurement error related to the position in the measurement-axis direction, caused by the inclination of the actual straight line determined in the error information acquisition step.

The correction step corrects the measurement-axis-direction position information obtained from the sensor, based on the correction information obtained in the correction information acquisition step.

The term reference plane used here means a plane having a planarity with a higher accuracy than a prescribed accuracy required for interaxis angle correction.

The term reference line used here means a line having a straightness with a higher accuracy than the prescribed accuracy required for interaxis angle correction.

The term reference sphere used here means a high accuracy sphere having a radius and sphericity with a higher accuracy than the prescribed accuracy required for interaxis angle correction. In the present invention, it is particularly preferable to use a reference hemisphere, which can be stably located on the table with extreme ease, as the reference sphere.

In the present invention, it is preferable to perform the perpendicularity correction of the table having a translation axis which would form an angle of 90 degrees with respect to the measurement axis.

It is preferable to use the sensor in a form measuring instrument serving as the apparatus.

Preferably, in the reference sphere measurement step, the reference sphere, which is located on the table, in the measurement-axis direction at a designated translation-axis-direction position on the reference sphere to acquire measurement-axis-direction contour information is scanned, and the scanning and acquisition at a plurality of different designated translation-axis-direction positions on the same reference sphere are performed, with the table being linearly translated.

Preferably, in the error information acquisition step, the information related to the inclination of the actual straight line from the ideal straight line which forms an angle of 90 degrees with respect to the measurement axis is obtained.

Preferably, in the correction step, the measurement-axis-direction position information obtained from the sensor is corrected, based on the correction information obtained in the correction information acquisition step to perform perpendicularity correction of the table.

In the present invention, preferably, in the correction information acquisition step, an equation for obtaining corrected measurement-axis-direction position information is determined, based on the inclination of the actual straight line obtained in the error information acquisition step and the position information of each peak point, the equation being defined by (the corrected measurement-axis-direction position information)=(the measurement-axis-direction position information obtained from the sensor)−(the inclination of the actual straight line)×(the translation-axis-direction position information)+(a constant determined based on the position information of each peak point).

Preferably, in the correction step, the position information in the measurement-axis direction obtained from the sensor and the position information in the direction of the translation axis are substituted into the equation determined in the correction information acquisition step to correct the position information in the measurement-axis direction obtained from the sensor.

With an interaxis angle correction method according to the present invention, because a reference sphere measurement step, a peak detection step, and a correction information acquisition step are combined based on the error measurement principle described above, it is possible to perform interaxis angle correction in a multiaxis apparatus with higher accuracy and greater ease.

DESCRIPTION OF THE PREFERRED EMBODIMENT

A preferred embodiment of the present invention will be described below with reference to the drawings.

Figure 1A:
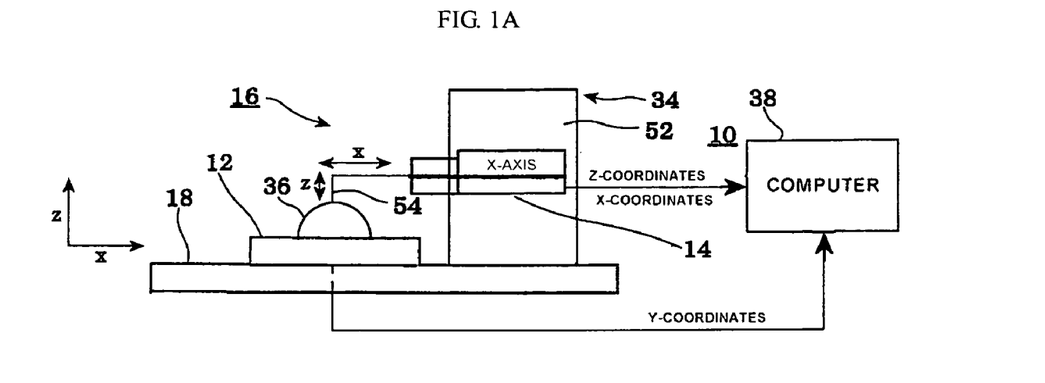
FIG. 1A is a side view showing an outlined structure of an interaxis angle correction apparatus that implements an interaxis angle correction method according to an embodiment of the present invention.
Figure 1B:
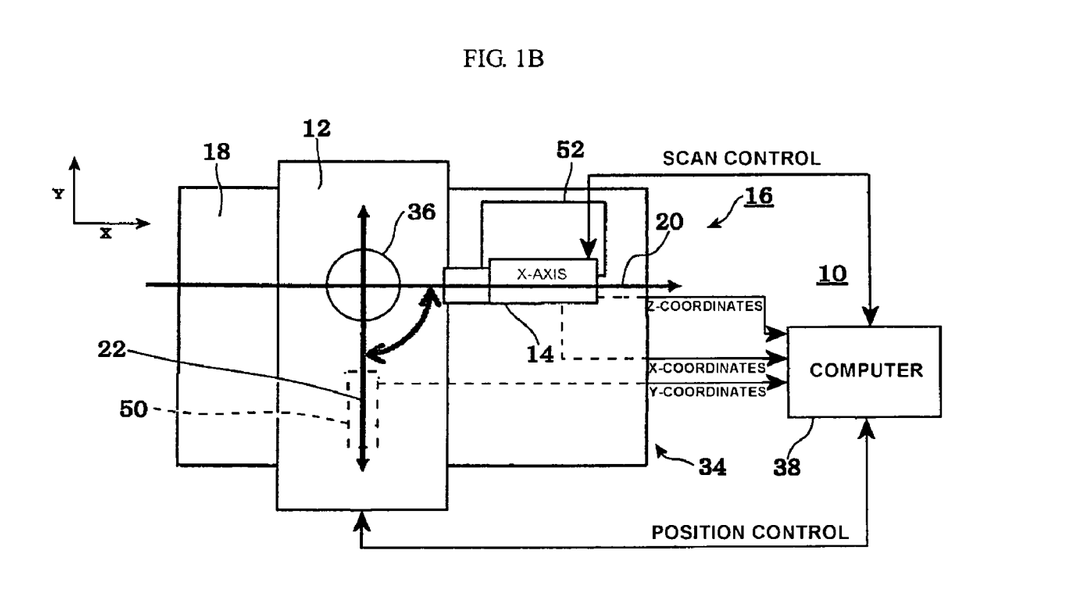
FIG. 1B is a top view showing an outlined structure of the interaxis angle correction apparatus.
Figure 1C:
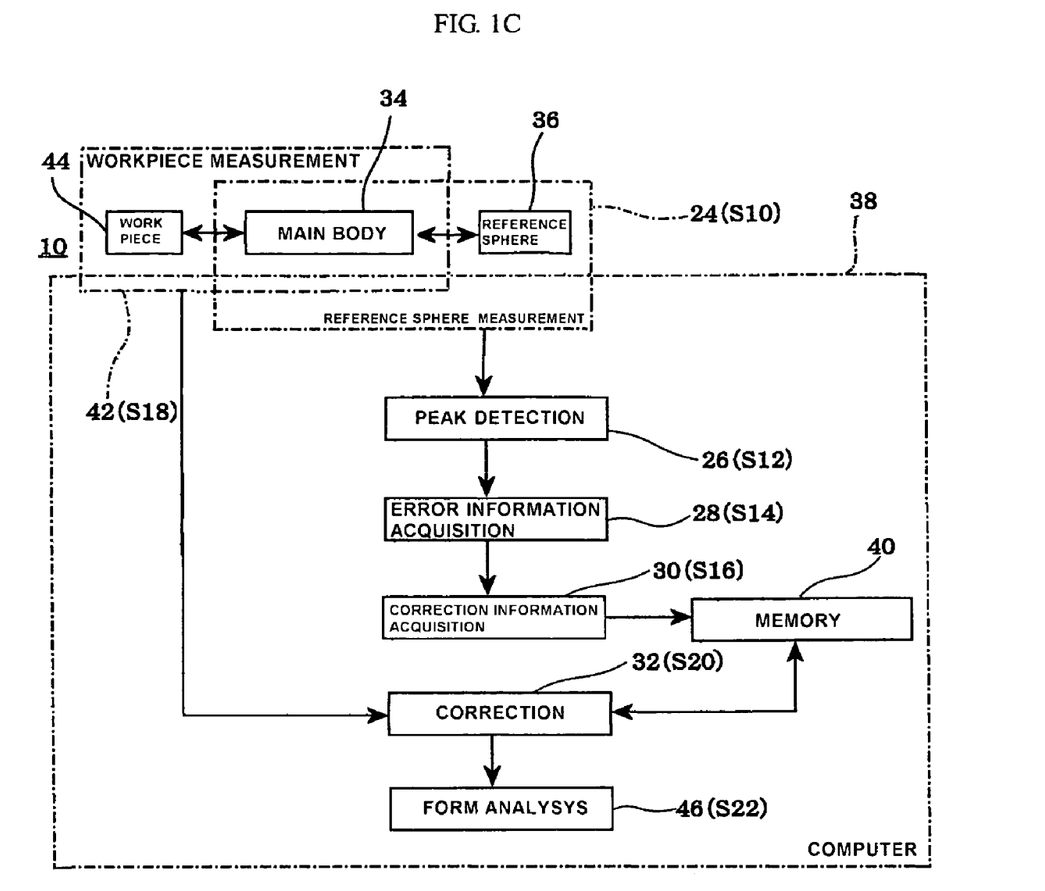
FIG. 1C is a block diagram showing an outlined configuration of the interaxis angle correction apparatus.

FIGS. 1A, 1B, and 1C show, in outline, the configuration of an interaxis angle correction apparatus 10 implementing an interaxis angle correction method according to an embodiment of the present invention. FIG. 1A is a side view of the apparatus, FIG. 1B is a top view of the apparatus, and FIG. 1C is a block diagram of the apparatus.

In a contour measuring apparatus (apparatus, form measuring instrument) 16 having a Y-axis table (table) 12 and a sensor 14, the interaxis angle correction apparatus 10 shown in these figures corrects the perpendicularity of the Y-axis table 12.

The Y-axis table 12 is moved straightly on a granite accuracy surface plate 18, for example, along a translation axis 22 which should form a 90 degree angle (desired angle) on an XY reference plane parallel to the granite accuracy surface plate 18, with respect to a measurement axis (reference line) 20 provided on the XY reference plane.

The sensor 14 uses the measurement axis 20 as a reference straight line provided on the XY reference plane parallel to the granite accuracy surface plate 18, and outputs Z-coordinate information of a point on an object placed on the Y-axis table 12 with X-coordinate information (measurement-axis-direction position information) corresponding to the Z-coordinate information.

The interaxis angle correction apparatus 10 also includes a reference sphere measurement unit 24, a peak detector 26, an error information acquisition unit 28, a correction information acquisition unit 30, and a correction unit 32, which is a feature of the present embodiment.

Here, the reference sphere measurement unit 24 includes, for example, a measurement apparatus main body 34, a reference hemisphere (reference sphere) 36, and a computer 38 having software for implementing measurement control of the measurement apparatus main body 34. The reference sphere measurement unit 24 performs a reference sphere measurement step (S10).

More specifically, at a designated Y-coordinate (translation-axis-direction position) on the reference hemisphere 36, which is placed on the Y-axis table 12, the reference sphere measurement unit 24 scans the reference hemisphere 36 along the measurement axis (X-axis) 20 using the sensor 14 to acquire XZ cross-sectional contour information. The reference sphere measurement unit 24 acquires such XZ cross-sectional contour information with the sensor 14 for a plurality of different designated Y-coordinates on the same reference hemisphere 36, which can be varied (obtained) by linearly translating the Y-axis table 12 along the translation axis 22.

The peak detector 26 is included in the computer 38, which includes, for example, software for executing correction computation, and performs a peak detection step (S12).

More specifically, based on the XZ cross-sectional contour information obtained by the reference sphere measurement unit 24, the peak detector 26 determines the peak point where the maximum Z-coordinate of the XZ cross-sectional contour is obtained at the designated Y-coordinate on the reference hemisphere 36. The peak detector 26 detects (searches for) X-coordinate information obtained by the sensor 14 at this peak point from data stored in a storage device. The peak detector 26 detects such a peak point for each designated Y-coordinate on the same reference hemisphere 36.

The error information acquisition unit 28 is included in the computer 38, which includes, for example, the software for executing the correction computation, and performs an error information acquisition step (S14).

More specifically, based on the X-coordinate information and the Y-coordinate information of each peak point obtained by the peak detector 26, the error information acquisition unit 28 determines an actual straight line representing the actual direction of motion of the Y-axis table 12. The error information acquisition unit 28 obtains data related to the inclination θ of this actual straight line with respect to an ideal straight line representing the ideal direction of motion of the Y-axis table 12.

The correction information acquisition unit 30 is included in the computer 38, which includes, for example, the software for executing the correction computation, and performs a correction information acquisition step (S16).

More specifically, the correction information acquisition unit 30 obtains correction information for correcting a measurement error related to the X-coordinate of a point on the sample placed on the Y-axis table 12, caused by the inclination θ of the actual straight line determined by the error information acquisition unit 28. The correction information acquisition unit 30 then stores the correction information in a memory 40 in the computer 38.

Then, a correction step (S20, described later) is performed on the measurement result obtained in a workpiece measurement step (S18) performed by a workpiece measurement unit 42.

The workpiece measurement unit 42 uses a workpiece 44 instead of the reference hemisphere 36, but has basically the same configuration as the reference sphere measurement unit 24, including the measurement apparatus main body 34 and the computer 38, which includes, for example, the software for executing measurement control of the measurement apparatus main body 34. The workpiece measurement unit 42 performs the workpiece measurement step (S18).

More specifically, in the workpiece measurement step (S18), the workpiece 44 is placed on the Y-axis table 12 instead of the reference hemisphere 36, and the shape of the workpiece 44 is measured by the workpiece measurement unit 42.

The correction unit 32 is included in the computer 38, which includes, for example, the software for executing the correction computation, and performs the correction step (S20).

More specifically, the correction unit 32 corrects the X-coordinate information obtained from the sensor 14 by measuring the shape of the workpiece 44 in the workpiece measurement step (S18), based on the correction information in the memory 40 (the correction information obtained by the correction information acquisition unit 30).

In this way, the interaxis angle correction apparatus 10 according to the present embodiment can correct measurement errors related to the X-coordinate information of points on the workpiece 44, which is caused by insufficient perpendicularity of the Y-axis table 12 in the contour measuring apparatus 16.

Therefore, in the present embodiment, it is possible to obtain highly reliable X-coordinate information and Y-coordinate information regardless of the perpendicularity of the contour measuring apparatus 16. By carrying out a shape computing step (S22) using the coordinate information obtained in the correction step (S20), a shape computing device 46 can obtain more highly reliable contour information about the workpiece 44.

In the present embodiment, the Y-coordinate information of a point on the object placed on the Y-axis table 12 is obtained by a Y-axis 50 sensor located on the translation axis 22 of the Y-axis table 12.

Moreover, in the present embodiment, the sensor 14 is placed on the granite accuracy surface plate 18 by means of a column 52. The sensor 14 includes a probe 54. The X-axis positioning accuracy and the Z-axis positioning accuracy of the sensor 14 are higher than a prescribed accuracy required for perpendicularity.

The interaxis angle correction method according to the present embodiment will be described more concretely below.

In the contour measuring apparatus 16, three dimensional contour information about the workpiece 44 is obtained based on a plurality of sets of two dimensional contour information, and the Y-axis table 12 is provided in order to acquire these sets of two dimensional contour information.

More specifically, the Y-axis table 12 is stopped so that the probe 54 is positioned at a designated Y-coordinate on the workpiece 44. Then, while scanning the workpiece 44, which is placed on the Y-axis table 12, in the X-axis direction using the sensor 14 in the contour measuring apparatus 16, Z-coordinate information and X-coordinate information of points on the workpiece 44 are acquired. Such XZ cross-sectional contour information formed by the Z-coordinate information and the X-coordinate information obtained in this way is acquired while varying the Y-coordinate on the workpiece 44 by linearly translating the Y-axis table 12. Thus, XZ cross-sectional contour information is acquired for a plurality of different Y-coordinates on the same workpiece 44.

The XZ cross-sectional contour information obtained at each Y-coordinate is combined, with the X-coordinates being aligned, to obtain three dimensional contour information about the workpiece 44.

Here, if the perpendicularity of the Y-axis table is skewed, that is, if the actual direction of motion of the Y-axis table with respect to the measurement axis is displaced from the ideal direction of motion, the X-coordinate information obtained by the sensor 14 differs depending on the Y-coordinates, even though the probe is positioned at the same point on the workpiece 44. In such a case, because the relationship between the X-coordinate and the Y-coordinate of each set of XZ cross-sectional contour information cannot be accurately determined, it may not be possible to obtain higher accuracy three dimensional contour information.

Therefore, in order to determine one set of three dimensional contour information with the contour measuring apparatus 16 based on a plurality of sets of XZ cross-sectional contour information, it is extremely important to accurately determine the relationship between the X-coordinate and the Y-coordinate of each set of XZ cross-sectional contour information.

Therefore, in the present embodiment, in order to obtain accurate X-coordinate information regardless of the perpendicularity of the Y-axis table 12, the reference hemisphere 36 is measured with the contour measuring apparatus 16, and the perpendicularity of the Y-axis table 12 is determined based on this measurement result. Then, correction information is acquired for correcting a measurement error due to insufficient perpendicularity of the Y-axis table 12.

<Reference Sphere Measurement>

Figure 2:
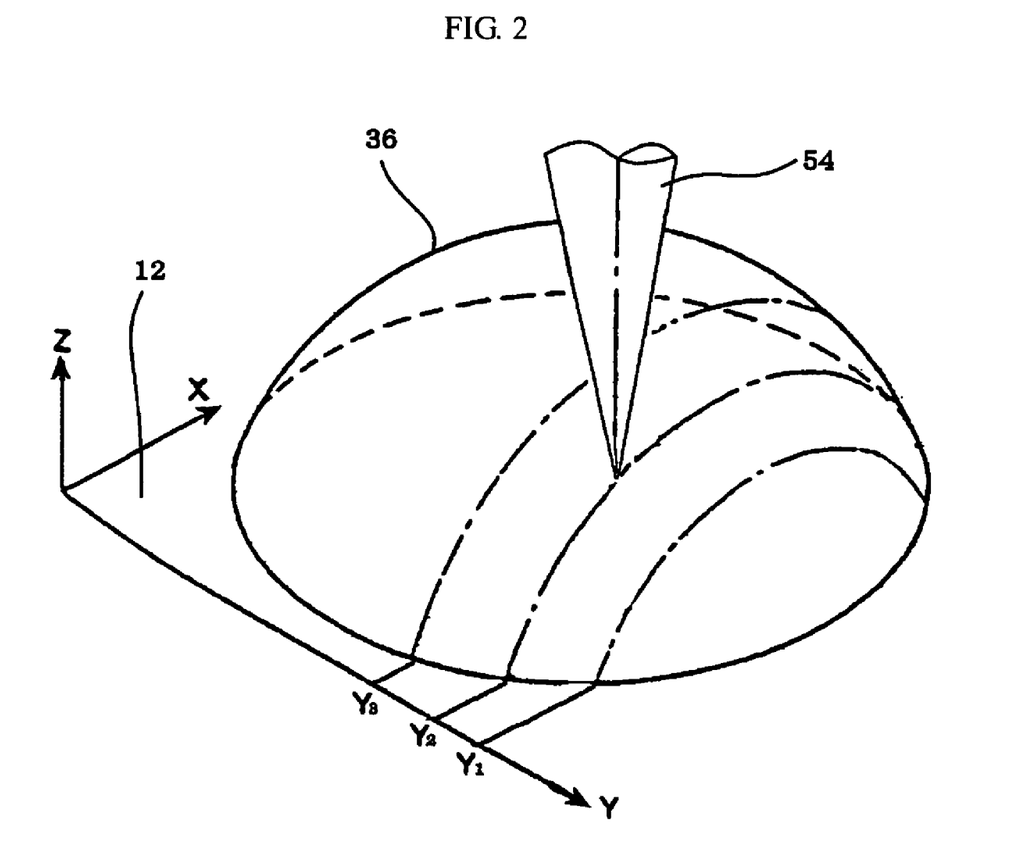
FIG. 2 is a diagram depicting a reference sphere measurement step according to the embodiment of the present invention.

As shown in FIG. 2, in the present embodiment, the reference hemisphere 36 is placed on the Y-axis table 12 with the bisecting surface of the reference sphere 36 facing the mounting surface of the Y-axis table 12. Then, the shape of the reference hemisphere 36 is measured with the contour measuring apparatus 16.

Figures 3A, 3B:
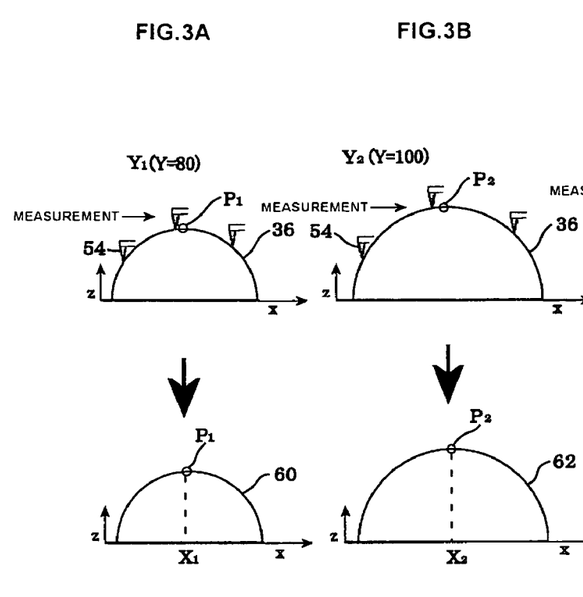
FIG. 3A is a diagram depicting contour information acquired in the reference sphere measurement step shown in FIG. 2 and a peak detection step at $Y=Y_1$.
FIG. 3B is a diagram depicting contour information acquired in the reference sphere measurement step shown in FIG. 2 and a peak detection step at $Y=Y_2$.

More specifically, in the present embodiment, at a designated Y-coordinate $Y_1$ (Y=80), as shown in FIG. 3A, when the probe 54 is moved in the X-axis direction, the probe 54 moves up and down following the contour of the reference hemisphere 36. This up and down motion is converted into an electrical signal in the sensor 14, and XZ cross-sectional contour information 60, that is, Z-coordinate information and X-coordinate information, at the designated Y-coordinate $Y_1$ (Y=80) is obtained.

Then, the Y-axis table is moved, and XZ cross-sectional contour information 62 at a designated Y-coordinate $Y_2$ (Y=100), as shown in FIG. 3B, is acquired in the same way as the acquisition of contour information at the designated Y-coordinate $Y_1$ shown in FIG. 3A.

Figure 3C:
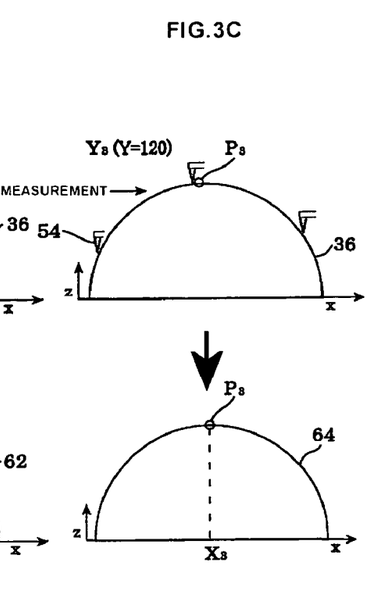
FIG. 3C is a diagram depicting contour information acquired in the reference sphere measurement step shown in FIG. 2 and a peak detection step at $Y=Y_3$.

Then, the Y-axis table is moved, and XZ cross-sectional contour information 64 at a designated Y-coordinate $Y_3$ (Y=120), as shown in FIG. 3C, is acquired in the same way as the acquisition of contour information at the designated Y-coordinate $Y_1$ shown in FIG. 3A.

<Peak Detection>

The peak detection step determines a peak point $P_1$ where the Z coordinate on the reference hemisphere 36 is the maximum at the designated Y-coordinate $Y_1$ (Y=80) on the reference hemisphere 36 based on the XZ cross-sectional contour information 60. Then, the peak detection step detects (searches for) X-coordinate information $X_1$ obtained from the sensor 14 corresponding to this peak point $P_1$.

Similarly, the peak detection step determines a peak point $P_2$ where the Z-coordinate on the reference hemisphere 36 is the maximum at the designated Y-coordinate $Y_2$ (Y=100) on the reference hemisphere 36 based on the XZ cross-sectional contour information 62. Then, the peak detection step detects X-coordinate information $X_2$ obtained from the sensor 14 corresponding to this peak point $P_2$.

Likewise, the peak detection step determines a peak point $P_3$ where the Z-coordinate on the reference hemisphere 36 is the maximum at the designated Y-coordinate $Y_3$ (Y=120) on the reference hemisphere 36 based on the XZ cross-sectional contour information 64. Then, the peak detection step detects X-coordinate information $X_3$ obtained from the sensor 14 corresponding to this peak point $P_3$.

According to the measurement principle of the present embodiment, if the actual direction of motion of the Y-axis table 12 with respect to the measurement axis (X-axis) 20 is exactly 90 degrees, the peak points $P_1$ ($X_1$, $Y_1$), $P_2$ ($X_2$, $Y_2$), and $P_3$ ($X_3$, $Y_3$) must be precisely aligned on an ideal straight line forming an angle of exactly 90 degrees with respect to the measurement axis (X-axis) 20.

However, since the peak points $P_1$, $P_2$, and $P_3$ are actually displaced due to insufficient perpendicularity of the Y-axis table 12, the X-coordinate information obtained from the sensor 14 is corrected based on the X-coordinate information and Y-coordinate information of the peak points $P_1$, $P_2$, and $P_3$.

<Error Information Acquisition>

Figure 4:
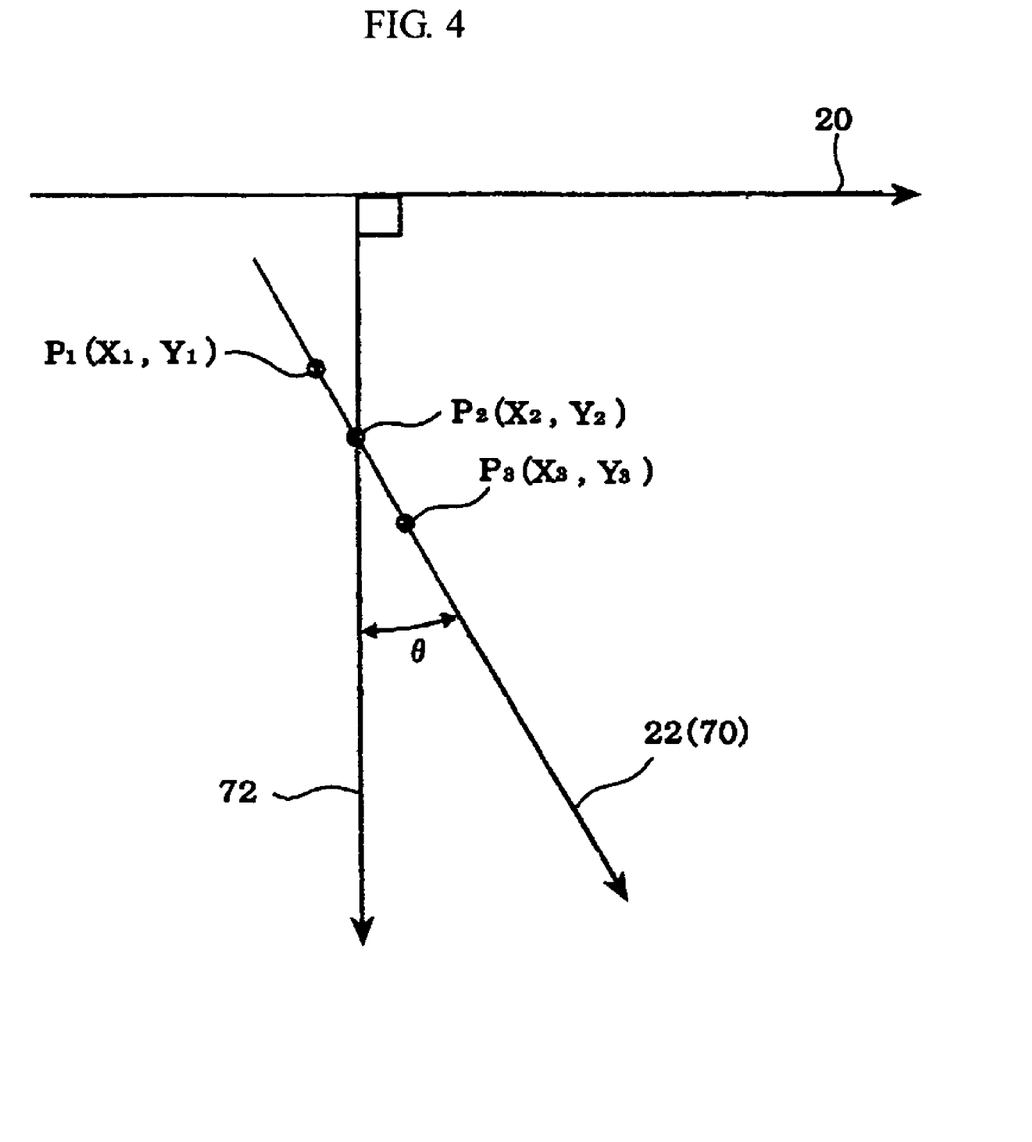
FIG. 4 is a diagram illustrating the perpendicularity of a table.

Accordingly, in the present embodiment, the error information acquisition step determines the actual straight line representing the actual direction of motion of the Y-axis table 12 based on the X-coordinate information $X_1$ and the Y-coordinate information $Y_1$ of the peak point $P_1$, the X-coordinate information $X_2$ and the Y-coordinate information $Y_2$ of the peak point $P_2$, and the X-coordinate information $X_3$ and the Y-coordinate information $Y_3$ of the peak point $P_3$, which are all obtained in the peak detection step. For example, by applying the least squares method to the coordinate information of the three peak points $P_1$, $P_2$, and $P_3$, an actual straight line 70 can be determined, as shown in FIG. 4, for example.

The error information acquisition step obtains information related to the inclination θ of the actual straight line 70 with respect to an ideal straight line 72 which forms an angle of 90 degrees with respect to the measurement axis 20 and which represents the ideal direction of motion.

<Correction Information Acquisition>

Then, the correction information acquisition step obtains an equation for acquiring corrected X-coordinate information, based on the inclination θ of the actual straight line 70 obtained in the error information acquisition step as well as the X-coordinate information and Y-coordinate information of each peak point. This equation is shown below:

(corrected X-coordinate information)=(X-coordinate information obtained from the sensor 14)−(the inclination θ of the actual straight line 70)×(Y-coordinate information obtained from the Y-axis sensor 50)+(a constant determined based on the coordinate information of each of the peak points $P_1$, $P_2$, and $P_3$).

The above mentioned step is described with reference to FIG. 4.

In FIG. 4, it is assumed that the X-coordinate information and the Y-coordinate information at the peak points $P_1$, $P_2$, and $P_3$ on the reference hemisphere obtained in the peak detection step have the values shown below.

Y: 80.0 ($Y_1$), 100.0 ($Y_2$), 120.0 ($Y_3$)

X: 92.5 ($X_1$), 100.0 ($X_2$), 107.5 ($X_3$)

Then, in the correction information acquisition step, the following equation is determined using, for example, the peak point $P_2$ ($X_2$, $Y_2$) at X=100 as a reference:

(corrected X-coordinate information)=(X-coordinate information obtained from the sensor 14)−(107.5−92.5)/(120.0−80.0)×(Y-coordinate information obtained from the Y-axis sensor 50)+(constant)=(X-coordinate information obtained from the sensor 14)−(0.375)×(Y-coordinate information obtained from the Y-axis sensor 50)+(37.5)

In this equation, the term (107.5−92.5)/(120.0−80.0) is the actual direction of motion of the Y-axis table 12 (=inclination θ of the actual straight line 70).

<Correction>

In the correction step, the X-coordinate information obtained from the sensor 14 and the Y-coordinate information obtained from the Y-axis sensor 50, which are obtained in the workpiece measurement step and have not yet been corrected, are substituted into the equation shown above to correct the X-coordinate information obtained from the sensor 14 to obtain corrected X-coordinate information.

<Form Analysis>

In the present embodiment, because the XZ cross-sectional contour information is obtained at each Y-coordinate of the workpiece based on the corrected X-coordinate information obtained as described above, it is possible to substantially reduce the error in position information on the XY plane between the sets of XZ cross-sectional contour information at each Y-coordinate on the workpiece.

In the present embodiment, more highly reliable three dimensional contour information is obtained from the XZ cross-sectional contour information at each Y-coordinate on the workpiece, as described above.

The perpendicularity is also evaluated in the conventional art together with the scale error and straightness. In the conventional art, a calibration gauge in which a plurality of reference spheres are arrayed two dimensionally is used. Therefore, in the conventional art, in order to eliminate the effects of errors in the calibration gauge itself and the effects of errors in the position of the calibration gauge in the apparatus, it is necessary to employ the above-mentioned inversion method.

In the conventional art, however, it is necessary to invert the calibration gauge manually, and furthermore, before and after inverting the calibration gauge, it is necessary, for example, to position the calibration gauge in the apparatus, to measure a plurality of spheres, and to perform computations. Accordingly, in the conventional art, the operation is complex and cumbersome.

Furthermore, in the conventional art, in other words, in the inversion method, considering that the operation before and after inversion of the calibration gauge is cumbersome and complex, it is difficult to satisfactorily eliminate the effects of errors in the calibration gauge itself and errors in the position of the calibration gauge in the apparatus.

In contrast, in the present embodiment, only the perpendicularity is considered, and the accuracy of a single reference sphere serving as a calibration gauge is designed to be higher than that in the conventional art, in other words, higher than the accuracy with which the plurality of reference spheres can be two dimensionally arranged and the positioning accuracy of the calibration gauge in the apparatus. Also, the present embodiment is based on the principle that, when the translation axis of the Y-axis table with respect to the measurement axis is exactly 90 degrees, the peak points at different Y-coordinates on the same reference sphere are precisely aligned on the ideal straight line.

In the present embodiment, because a single high accuracy sphere is used as a calibration gauge, the effects of errors in the calibration gauge itself and effects due to directionality can be substantially reduced so as to be negligible compared with the conventional art, that is to say, compared with the effects of errors involved in two dimensionally arranging a plurality of reference spheres in the calibration gauge and errors involved in positioning the calibration gauge in the apparatus. Accordingly, in the present embodiment, simply by measuring errors, calculating corrections, and so on, it is possible to measure only the perpendicularity information about the Y-axis table, easily and with high accuracy, without using the conventional inversion method.

Furthermore, because inversion of calibration gauge and various procedures required before and after such inversion can be substantially eliminated in the present embodiment, perpendicularity correction of the Y-axis table can be simplified. Particularly in the conventional art, because it is necessary to perform inversion of the calibration gauge manually, it is difficult to completely automate the perpendicularity measurement using a computer. In contrast, because, for example, the motion of the Y-axis table to each designated Y-coordinate can be controlled by a computer, it is possible to completely automate the perpendicularity measurement. Therefore, in the present embodiment, it is possible to perform perpendicularity measurement more easily than in the conventional art.

In the configuration described above, the peak points have been determined at the three different Y-coordinate positions on the same reference sphere. Instead of this, however, so long as the positions along the translation axis on the same reference sphere differ, peak points may be determined at two different Y-coordinate positions or four or more different Y-coordinate positions. If the peak points are determined at two positions, it is possible to determine the actual straight line passing through the peak points at these two positions, for example. If the peak points are determined at three or more positions, it is possible to determine the actual straight line using the least squares method, for example.

The above configuration has been described in terms of an example in which a single reference sphere is used. However, the present invention is not limited thereto, and it is possible to use a plurality of reference spheres. For example, it is possible to arrange a plurality of reference spheres on the table, to determine the perpendicularity at the positions thereof from the peak values of each reference sphere, and to correct the perpendicularity over the entire stroke of the Y-axis table.

In the configuration described above, a perfectly spherical object or an object including a spherical part can be used. However, it is particularly preferable to use a hemispherical object, which can be easily positioned on the table.

The above configuration has been described in terms of an example in which perpendicularity correction of the table is carried out. However, the present invention is not limited thereto, and it is also possible to apply the present invention to correction of an interaxis angle in a multiaxis apparatus (measurement apparatus or processing apparatus).

Although the above configuration has been described in terms of an example in which the perpendicularity between the X and Y axes of the table is corrected, perpendicularity correction between the Y and Z axes and between the Z and X axes can be carried out in the same way as for the perpendicularity correction between the X and Y axes.

What is claimed is:

1. An interaxis angle correction method for an apparatus including a table that linearly translates in a reference plane along a translation axis which should form a desired angle at the reference plane with respect to a reference line provided on the reference plane, and a sensor having the reference line provided on the reference plane as an axis of measurement, for acquiring measurement-axis-direction position information on a sample located on the table, the method correcting an error in an angle formed by the measurement axis and the translation axis, and comprising:

a reference sphere measurement step of scanning, with the sensor, a reference sphere located on the table of the apparatus, in the measurement-axis direction at a designated translation-axis-direction position on the reference sphere to acquire measurement-axis-direction contour information, and performing the scanning and acquisition at a plurality of different designated translation-axis-direction positions on the same reference sphere, with the table being linearly translated;

a peak detection step of detecting a peak point in the measurement-axis-direction contour information acquired in the reference sphere measurement step, and performing the detection for each set of measurement-axis-direction contour information acquired in the reference sphere measurement step;

an error information acquisition step of determining an actual straight line representing an actual direction of motion of the table based on position information of each peak point detected in the peak detection step, and obtaining information related to the inclination of the actual straight line with respect to an ideal straight line representing an ideal direction of motion of the table;

a correction information acquisition step of obtaining correction information for correcting a measurement error related to the position in the measurement-axis direction, caused by the inclination of the actual straight line determined in the error information acquisition step; and a correction step of correcting the measurement-axis-direction position information obtained from the sensor, based on the correction information obtained in the correction information acquisition step.

2. An interaxis angle correction method according to claim 1, wherein:

using the sensor in a form measuring instrument serving as the apparatus, the reference sphere measurement step scans the reference sphere, which is located on the table, in the measurement-axis direction at a designated translation-axis-direction position on the reference sphere to acquire measurement-axis-direction contour information, and performs the scanning and acquisition at a plurality of different designated translation-axis-direction positions on the same reference sphere, with the table being linearly translated;

the error information acquisition step obtains the information related to the inclination of the actual straight line from the ideal straight line which forms an angle of 90 degrees with respect to the measurement axis; and the correction step corrects the measurement-axis-direction position information obtained from the sensor based on the correction information obtained in the correction information acquisition step to perform perpendicularity correction of the table.

3. An interaxis angle correction method according to claim 2, wherein:

the correction information acquisition step determines an equation for obtaining corrected measurement-axis-direction position information, based on the inclination of the actual straight line obtained in the error information acquisition step and the position information of each peak point, the equation being defined by (the corrected measurement-axis-direction position information)=(the measurement-axis-direction position information obtained from the sensor)−(the inclination of the actual straight line)×(the translation-axis-direction position information)+(a constant determined based on the position information of each peak point); and the correction step substitutes the measurement-axis-direction position information obtained from the sensor and the translation-axis-direction position information into the equation determined in the correction information acquisition step to correct the measurement-axis-direction position information obtained from the sensor.

* * * * *